United States Patent [19]

Saito et al.

[11] Patent Number: 4,462,610
[45] Date of Patent: Jul. 31, 1984

[54] VEHICLE HEIGHT ADJUSTING APPARATUS

[75] Inventors: Tetsuo Saito; Sumio Ema, both of Kanagawa, Japan

[73] Assignee: Tokico Ltd., Kanagawa, Japan

[21] Appl. No.: 389,462

[22] Filed: Jun. 17, 1982

[30] Foreign Application Priority Data

Jun. 19, 1981 [JP] Japan .................... 56-90695[U]

[51] Int. Cl.³ .................................. B60G 17/00
[52] U.S. Cl. ................... 280/707; 123/198 D; 180/41; 280/6.1; 280/714; 280/DIG. 1
[58] Field of Search .......... 280/707, 702, 708, 709, 280/711, 714, 715, DIG. 1, 688, 689, 690, 6 R, 6.1, DIG. 1; 180/41; 123/198 D

[56] References Cited

U.S. PATENT DOCUMENTS

| | | | |
|---|---|---|---|
| 3,602,207 | 8/1971 | Kilmer | 123/198 D X |
| 4,266,790 | 5/1981 | Uemura et al. | 280/6.1 |
| 4,354,693 | 10/1982 | Maeda et al. | 280/DIG. 1 X |
| 4,364,574 | 12/1982 | Saito | 280/707 X |
| 4,396,202 | 8/1983 | Kami et al. | 280/6 R |

FOREIGN PATENT DOCUMENTS

| | | |
|---|---|---|
| 56-6022 | 1/1981 | Japan ............ 123/198 D |
| 56-31906 | 3/1981 | Japan . |
| 56-31907 | 3/1981 | Japan . |

Primary Examiner—Joseph F. Peters, Jr.
Assistant Examiner—Mitchell J. Hill
Attorney, Agent, or Firm—Wenderoth, Lind & Ponack

[57] ABSTRACT

A vehicle height adjusting apparatus includes a height adjustor receiving therein or exhausting therefrom pressurized air to adjust the height of a vehicle, an air compressor for supplying pressurized air to the height adjustor, a temperature detector for detecting the temperature of the air compressor, and a control device including an actuating circuit for operating the air compressor and a memory circuit receiving a signal from the temperature detector to stop the operation of the actuating circuit when the temperature detected by the temperature detector exceeds a predetermined level.

2 Claims, 2 Drawing Figures

4,462,610

VEHICLE HEIGHT ADJUSTING APPARATUS

BACKGROUND OF THE INVENTION

This invention relates to a vehicle height adjusting apparatus for use in a vehicle such as an automobile.

Conventional vehicle height adjusting apparatus mounted on a vehicle such as an automobile comprises air bags or air springs provided between sprung and unsprung masses of the vehicle, and the height of the vehicle is adjusted by supplying or discharging pressurized air into or from the air bags, thereby adjusting the height of the vehicle. An air compressor is connected to the air spring for supplying pressurized air to the air bags. The air bags are usually associated with hydraulic dampers. Such apparatus generally operates satisfactorily. However, there is a shortcoming that the air compressor will sometimes be operated for an excessively long time period when an excessively heavy load is mounted on the vehicle, or when a failure or leakage occurs in the circuit connecting the air bags with the air compressor. In such case, the height of the vehicle cannot be adjusted to the predetermined level, and the air compressor may fail due to the overheating.

Its has been proposed to overcome this shortcoming by detecting the operating time period of supplying pressurized air into the air bags and stopping the supply of the pressurized air when the operating time exceeds a predetermined time. However with this procedure the air compressor will sometimes be stopped even though the air compressor has not been overheated.

SUMMARY OF THE INVENTION

The present invention has been made with respect to the circumstances aforementioned and, according to the invention, there are provided in the vehicle height adjusting apparatus of the above described type a temperature detector detecting the temperature of the air compressor, and a control device for stopping the air compressor when the temperature detected by temperature detector exceeds a predetermined level. The control device includes an actuating circuit for operating the air compressor, and a memory circuit receiving a signal from the temperature detector and stopping the operation of the actuating circuit when the temperature of the air compressor exceeds the predetermined level.

According to the invention, it is possible to prevent the overheating of the air compressor even when the supply of the pressurized air to the air bag or the height adjustor is normally performed, thereby reducing the chance of failure of the air compressor, and the operation of the height adjusting apparatus can be controlled as desired.

BRIEF DESCRIPTION OF THE DRAWINGS

The present invention will now be explained in detail with reference to the accompanying drawings exemplifying a preferred embodiment of the invention, in which.

DETAILED DESCRIPTION OF THE PREFERRED EMBODIMENT

Figure 1:
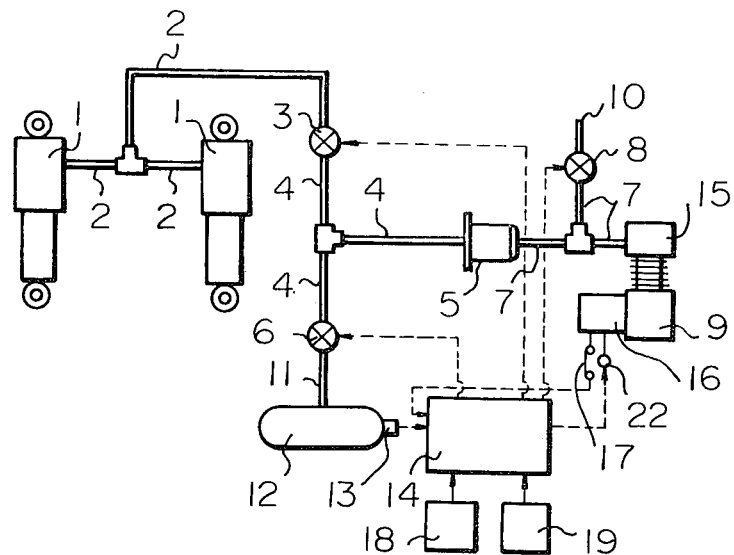
FIG. 1 is a schematic view of an embodiment of the invention.
Figure 2:
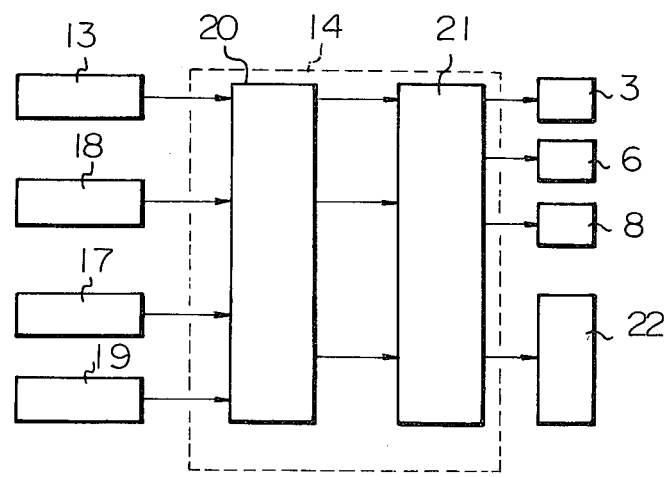
FIG. 2 is a block diagram showing the operation of the control device according to the invention.

In FIG. 1, there are illustrated two height adjustors 1 respectively shown as combined hydraulic damper and air spring units which are mounted between the sprung and unsprung masses such as the chassis and a wheel shaft (not shown) of an automobile. The air springs define respectively variable volume air bags to which pressurized air is supplied into or exhausted therefrom through a piping 2. When pressurized air is supplied into the air springs the distance between the chassis and the wheel shaft increases thereby increasing the height of the vehicle. When a part of the air contained in the air bags is exhausted through the piping 2 and an inlet-/exhaust first valve 3, the volume in the air bags decreases and, accordingly, the height of the vehicle decreases. The inlet/exhaust valve 3 is, preferably, an electromagnetically operated normally closed shut-off valve for selectively closing the piping 2 or connecting the piping 2 with a piping 4 which is connected with a dehumidifier 5 and with a supply second valve 6. The dehumidifier 5 is connected through with an exhaust piping 7 third valve 8 and with the outlet port of an air compressor 9. The exhaust valve 8 is connected to the atmosphere through a piping 10. The supply valve 6 is connected to an air tank 12 through a piping 11. The valves 6 and 8 are preferably electromagnetically operated normally closed shut-off valves.

A pressure detector 13 detects the pressure in the air tank 12, and the output signal of the detector 13 is supplied to a control device 14. The air compressor 9 consists of a main body 15 and an electric motor 16 for driving the main body 15. A temperature detector 17 is mounted on the motor 16 for detecting the temperature of the motor 16. The output signal of the temperature detector 17 is also supplied to the control device 14. The control device 14 further receives signals from a height detecting device 18 detecting the height of the vehicle, and from an ignition switch or the main switch 19 of the electric system of the vehicle. The control device 14 consists of a memory circuit 20 preferably including a flip-flop circuit, and an actuating circuit 21. The actuating circuit 21 ON-OFF controls a relay 22 for starting/stopping the motor 16 and for operating electromagnetic valves 3, 6 and 8.

In operation, the main switch 19 is firstly turned to ON, whereby the memory circuit 20 of the control device 14 is ready to actuate the actuating circuit 21 in response to signals received from detectors 13, 17 and 18. However, when the control device 14 does not receive any signals from detectors 13, 17 and 18, the control device does not generate valve opening signals to valves 3, 6 and 8 and an ON signal to the relay 22. That is, the valves 3, 6 and 8 remain closed and the motor 16 is not actuated.

When the detector 13 detects that the pressure in the air tank 12 is less than a predetermined level, the control device 14 generates in response to the memory stored in the circuit 20 a valve opening signal to the valve 6 and an ON signal to the relay 22 thereby actuating the air compressor 9, whereby pressurized air is supplied through the dehumidifier 5 to the air tank 12. When the pressure in the air tank 12 elevates to a predetermined level, the detector 13 supplies a signal to the control device 14 which generates a valve closing signal to the valve 6 and an OFF signal to the relay 22. However, in supplying pressurized air to the air tank 12, if a failure has occurred in such as the piping 4, then the air compressor would continue operation for a long time period and thus may overheat the motor 16. The temperature detector 17 supplies to the memory circuit 20 of the control device 14 a signal indicating that the temperature of the motor 16 exceeds a predetermined level. The memory circuit 20 acts to deactivate the actuating circuit 21 thereby cancelling the ON condition of the relay 22. The motor 16 stops, and failure due to the overheating of motor 16 is prevented. In such condition, any signals from the detectors 13, 17 and 18 cannot actuate the actuating circuit 21.

To set the memory circuit 20 to its normal condition, it is necessary to temporarily turn OFF and, thereafter, turn ON the main switch 19. Incidentally, if the temperature detector 17 is still generating a signal indicating the overheated condition, the memory circuit 20 does not return to the normal condition by simply turning on the main switch 19.

In the normal condition, the temperature detector 17 indicates that the temperature of the motor 16 is lower than the predetermined temperature, and the detector 13 shows that the air tank 12 contains therein pressurized air at a pressure exceeding the predetermined level. In such condition, when the detector 18 generates a signal indicating that the height of the vehicle exceeds a predetermined height, the control device 14 generates valve opening signals to valves 3 and 8. A part of the air received in the height adjustors 1 escapes to the atmosphere through the piping 2, valve 3, piping 4, the dehumidifier 5, piping 7, the valve 8 and the piping 10, thereby decreasing the volume of air bags 2 and reducing the height of the vehicle. When the height of the vehicle decreases to the predetermined level, the detector 18 stops the generation of the high height signal, and the control device 14 closes the valves 3 and 8. The height adjustors 1 maintain the predetermined height.

When the detector 18 detects that the height of the vehicle is lower than the predetermined height, the control device 14 generates valve opening signals to valves 3 and 6, whereby pressurized air is supplied into height adjustors 1 from the air tank 12. The height of the vehicle gradually increases to the predetermined height. The detector 18 stops the generation of the low height signal and the control device 14 generates valve closing signals to valves 3 and 6. In supplying the pressurized air from the air tank 12 to height adjustors 1, the pressure in the air tank 12 may sometimes decrease below the predetermined pressure. The detector 13 generates a low pressure signal, the control device 14 actuates the relay 22 and the air compressor 9 operated to supply pressurized air both to the air tank 12 and to height adjustors 1.

If, upon operating the air compressor 9, the compressor becomes overheated, for example due to leakage in the pipings 2, 4 or 7 or due to very heavy loading of the vehicle, the temperature detector 17 detects such overheating, and the control device stops the air compressor.

It has been described that when the height detector 18 detects the low height condition, the control device 14 opens the valves 3 and 6. However, the control device 14 may also actuate the relay 22 so that pressurized air is supplied to height adjustors 1 from the air compressor 9 and from the air tank 12.

As described heretofore, according to the invention, the operation of the height adjusting apparatus is controlled by detecting the temperature of the air compressor, and thus it is possible to prevent overheating of the air compressor, thereby decreasing the chance of failure of the air compressor and minimizing the consumption of electric energy.

The height adjustors 1 shown in the illustrated embodiment are combined hydraulic damper and air spring units. However, the invention is not limited to this specific embodiment and may be applicable to height adjustors formed separately from hydraulic dampers. Further, the temperature detector 17 in the illustrated embodiment is mounted on the motor 16, but the detector 17 may be mounted on the main body 15 of the air compressor. Further, it has been described that the control device 14 is deactivated when the temperature detector 17 generates an overheating signal. However, it is possible to maintain the valve opening/closing function for the valves 3, 6 and 8.

What is claimed is:

1. An apparatus for adjusting the height of a vehicle, said apparatus comprising:
   height adjustor means, adapted to be connected between sprung and unsprung masses of the vehicle, for receiving therein pressurized air to increase the height of the vehicle and for having exhausted therefrom pressurized air to decrease the height of the vehicle;
   air compressor means connected to said height adjustor means and operable for supplying thereto pressurized air to increase the height of the vehicle;
   control means for controlling the operation of said air compressor means and for preventing the overheating of said air compressor means, said control means comprising actuating circuit means connected to said air compressor means for operating said air compressor means, temperature detector means for detecting the temperature of said air compressor means and for generating a signal representative thereof, and memory circuit means connected to said actuating circuit means and to said temperature detector means for receiving said signal from said temperature detector means, for, upon the temperature detected by said temperature detector means exceeding a predetermined level, deactivating said actuating circuit means and thereby stopping operation of said air compressor means, and for, upon the temperature detected by said temperature detector means dropping below said predetermined level, preventing automatic reactivation of said actuating circuit means and restarting of operation of said air compressor means; and
   means for selectively setting said memory circuit means in a normal condition thereof to reactivate said actuating circuit means to restart operation of said air compressor means upon said detected temperature being below said predetermined level, said setting means comprising a vehicle main switch connected to said memory circuit means and selectively manually operable to set said memory circuit means in said normal condition.

2. An apparatus as claimed in claim 1, further comprising an air tank for receiving and storing pressurized air, piping interconnecting said height adjustor means, said air compressor means and said air tank, first normally closed valve means in said piping for normally isolating said height adjustor means from said air compressor means and said air tank, second normally closed valve means in said piping for normally isolating said air tank from said height adjustor means and said air compressor means, third normally closed valve means in said piping for selectively being opened to the exterior atmosphere, said first, second and third valve means being connected to said actuatng circuit means to be opened thereby, height detector means for detecting the height of the vehicle and for supplying a signal representative thereof to said memory circuit means, whereby said memory circuit means activates said actuating circuit means to open selected of said first, second and third valve means to adjust the height of the vehicle, and pressure detector means for detecting the pressure within said air tank and for supplying a signal representative thereof to said memory circuit means, whereby, upon the detected pressure dropping below a predetermined value, said memory circuit means activates said actuating circuit means to open said second valve means and to operate said air compressor means, thereby to supply pressurized air to said air tank.

* * * * *